United States Patent
Okuhira et al.

(10) Patent No.: US 10,480,546 B2
(45) Date of Patent: Nov. 19, 2019

(54) HYDRAULIC CYLINDER

(71) Applicant: SMC CORPORATION, Chiyoda-ku (JP)

(72) Inventors: Hiroyuki Okuhira, Moriya (JP); Kenji Imai, Tsukuba (JP); Tatsunori Yanase, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 87 days.

(21) Appl. No.: 15/509,651

(22) PCT Filed: Aug. 24, 2015

(86) PCT No.: PCT/JP2015/073658
§ 371 (c)(1),
(2) Date: Mar. 8, 2017

(87) PCT Pub. No.: WO2016/039123
PCT Pub. Date: Mar. 17, 2016

(65) Prior Publication Data
US 2017/0284428 A1    Oct. 5, 2017

(30) Foreign Application Priority Data

Sep. 12, 2014    (JP) ................. 2014-185855

(51) Int. Cl.
*F15B 15/14*        (2006.01)
*F16J 7/00*         (2006.01)
*C25D 11/04*        (2006.01)

(52) U.S. Cl.
CPC .......... *F15B 15/1433* (2013.01); *C25D 11/04* (2013.01); *F15B 15/1457* (2013.01);
(Continued)

(58) Field of Classification Search
CPC .............. F15B 15/1433; F15B 15/1457; F15B 15/1442; F15B 15/1461; F16J 15/182
See application file for complete search history.

(56) References Cited

U.S. PATENT DOCUMENTS 3,339,932 A * 9/1967 Maha ..................... F16J 15/004
                                                        277/552
5,842,911 A    12/1998 Weber
(Continued)

FOREIGN PATENT DOCUMENTS

CN           1253885 A        5/2000
DE    10 2010 022 207 A1     11/2011
(Continued)

OTHER PUBLICATIONS

Combined Office Action and Search Report dated Oct. 30, 2017 in Chinese Patent Application No. 201580048754.7 (with English language translation).
(Continued)

*Primary Examiner* — Thomas E Lazo
*Assistant Examiner* — Michael Quandt
(74) *Attorney, Agent, or Firm* — Oblon, McClelland, Maier & Neustadt, L.L.P.

(57) ABSTRACT

A piston rod and a rod cover which constitute this hydraulic cylinder are configured from aluminum or an aluminum alloy. An alumite coating film is formed on at least a part of the inner wall surface of the rod cover that constitutes a rod insertion hole, and a diamond-like carbon coating film is formed on the outer wall surface of the piston rod, said diamond-like carbon coating film being in sliding contact with the alumite coating film.

2 Claims, 7 Drawing Sheets

(52) U.S. Cl.
CPC ............. *F16J 7/00* (2013.01); *F15B 15/1461* (2013.01); *F15B 2215/305* (2013.01)

(56) References Cited

U.S. PATENT DOCUMENTS

| | | | |
|---|---|---|---|
| 5,974,948 A | 11/1999 | Thompson et al. | |
| 6,062,923 A | 5/2000 | Kai | |
| 6,928,922 B2 * | 8/2005 | Nagai | F04B 1/2014 277/438 |
| 8,690,128 B1 | 4/2014 | Schwindaman et al. | |
| 2010/0212491 A1 | 8/2010 | Nishi | |
| 2011/0094628 A1 | 4/2011 | Mitsuda et al. | |
| 2011/0283879 A1 | 11/2011 | Schwindaman et al. | |
| 2012/0073961 A1 | 3/2012 | Kagawa | |
| 2013/0032027 A1 * | 2/2013 | Orihara | F15B 15/14 91/418 |
| 2015/0004021 A1 * | 1/2015 | Kang | F04B 35/045 417/410.1 |

FOREIGN PATENT DOCUMENTS

| | | | |
|---|---|---|---|
| JP | 2001-107860 A | 4/2001 |
| JP | 2001-241474 A | 9/2001 |
| JP | 2009-68557 A | 4/2009 |
| JP | 2011-89172 A | 5/2011 |
| JP | 2011-158039 A | 8/2011 |
| JP | 2012-71683 A | 4/2012 |
| JP | 2014-59000 A | 4/2014 |

OTHER PUBLICATIONS

Office Action dated Jul. 4, 2017 in Japanese Patent Application No. 2014-185855 (with partial English language translation).
International Search Report dated Nov. 17, 2015 in PCT/JP2015/073658 filed Aug. 24, 2015.
Japanese Office Action dated Jan. 31, 2017 in Japanese Application 2014-185855 filed Sep. 12, 2014 (with partial English translation).
Extended European Search Report dated Apr. 17, 2018 in Patent Application No. 15840283.4, 8 pages.
Office Action dated Aug. 8, 2018 in Korean Patent Application No. 10-2017-7009795 (with English language translation), 7 pages.
Office Action dated Sep. 26, 2019 in Indian Patent Application No. 201747008255 w/English translation.

* cited by examiner

HYDRAULIC CYLINDER

TECHNICAL FIELD

The present invention relates to a hydraulic cylinder (fluid pressure cylinder) in which a piston is displaced along an axial direction under the action of a working fluid.

BACKGROUND ART

Conventionally, a fluid pressure cylinder has widely been used as a transport means for workpieces or the like. A fluid pressure cylinder of this type comprises a cylinder main body having a cylinder hole formed therein, a piston disposed in the cylinder hole and which is displaced along an axial direction under the action of a working fluid, a piston rod connected to the piston, and a rod cover disposed on an inner wall surface that makes up the cylinder hole and having a rod insertion hole through which the piston rod is inserted (see, for example, Japanese Laid-Open Patent Publication No. 2009-068557). A cylindrical bush that slidably supports the piston rod along the axial direction is provided in the rod insertion hole.

SUMMARY OF INVENTION

With the aforementioned conventional fluid pressure cylinder, in general, a piston rod made of iron, a rod cover made of aluminum, and a bush made of copper are used. However, in this case, the number of parts and the weight of the fluid pressure cylinder increases, while in addition, for example, in an environment (i.e., a copper-based material non-usage environment) such as a production line for a secondary battery where use of copper-based materials is prohibited or restricted, an inconvenience results in that such a conventional fluid pressure cylinder cannot be used.

In order to resolve this inconvenience, for example, by adopting an aluminum piston rod while omitting the bush, it may be considered to form an alumite film, which is placed in sliding contact with the piston rod, on an inner wall surface constituting the rod insertion hole. However, in this case, there is a concern that adhesive wear may take place between the piston rod and the alumite film, such that the service life of the fluid pressure cylinder becomes shortened.

The present invention has been devised taking into consideration the aforementioned problems, and has the object of providing a fluid pressure cylinder, in which the number of component parts can be reduced together with reducing weight and extending the service life thereof, and further, in which the fluid pressure cylinder can be used in a copper-based material non-usage environment.

In order to achieve the aforementioned objects, a fluid pressure cylinder according to the present invention is characterized by a cylinder main body in which a cylinder hole is formed, a piston disposed in the cylinder hole and which is displaced along an axial direction under the action of a working fluid, a piston rod connected to the piston, and a rod cover in which a rod insertion hole is formed through which the piston rod is inserted. In the fluid pressure cylinder, the piston rod and the rod cover are constituted from aluminum or an aluminum alloy, and an alumite film or a diamond-like carbon film is formed on at least a portion of an inner wall surface of the rod cover constituting the rod insertion hole. Further, in the case that the alumite film is formed on the inner wall surface of the rod cover, a diamond-like carbon film that slides in contact with the alumite film is formed on the piston rod, whereas in the case that the diamond-like carbon film is formed on the inner wall surface of the rod cover, an alumite film that slides in contact with the diamond-like carbon film is formed on the piston rod.

In accordance with such a configuration, the diamond-like carbon film (or the alumite film), which is formed on the outer wall surface of the piston rod, slides against the alumite film (or the diamond-like carbon film) formed on the inner wall surface of the rod cover, and therefore, adhesive wear can be suppressed. Consequently, it is possible to realize a long service life of the fluid pressure cylinder. Further, in addition to constituting the rod cover and the piston rod from aluminum or an aluminum alloy, since there is no need to provide a copper bush in the rod insertion hole, the number of component parts can be reduced, a reduction in weight can be achieved, and the fluid pressure cylinder can be used even in a copper-based material non-usage environment.

In the above-described fluid pressure cylinder, the alumite film may be formed on the inner wall surface of the rod cover, and the diamond-like carbon film that slides in contact with the alumite film may be formed on an outer wall surface of the piston rod. In this case, since the diamond-like carbon film is formed on the outer wall surface of the piston rod, which is easier to coat than the inner wall surface of the rod cover, manufacturing costs for the fluid pressure cylinder can be reduced.

In the above-described fluid pressure cylinder, an accommodating groove in which a lubricant is accommodated may be formed on the inner wall surface of the rod cover. In accordance with such a configuration, since the lubricant can be supplied between the alumite film and the diamond-like carbon film, the service life of the fluid pressure cylinder can further be increased. Further, since the accommodating groove can be formed at a position where a conventional bush has previously been located, it is possible to suppress an increase in the scale of the fluid pressure cylinder, even if an accommodating groove is formed therein.

In accordance with the fluid pressure cylinder of the present invention, the number of component parts can be reduced together with reducing weight and extending the service life thereof, and further, the fluid pressure cylinder can be used in a copper-based material non-usage environment.

The above and other objects, features, and advantages of the present invention will be easily understood from the following description when taken in conjunction with the accompanying drawings.

DESCRIPTION OF EMBODIMENTS

A description of a preferred embodiment in relation to a fluid pressure cylinder according to the present invention will be described with reference to the accompanying drawings.

Figure 1:
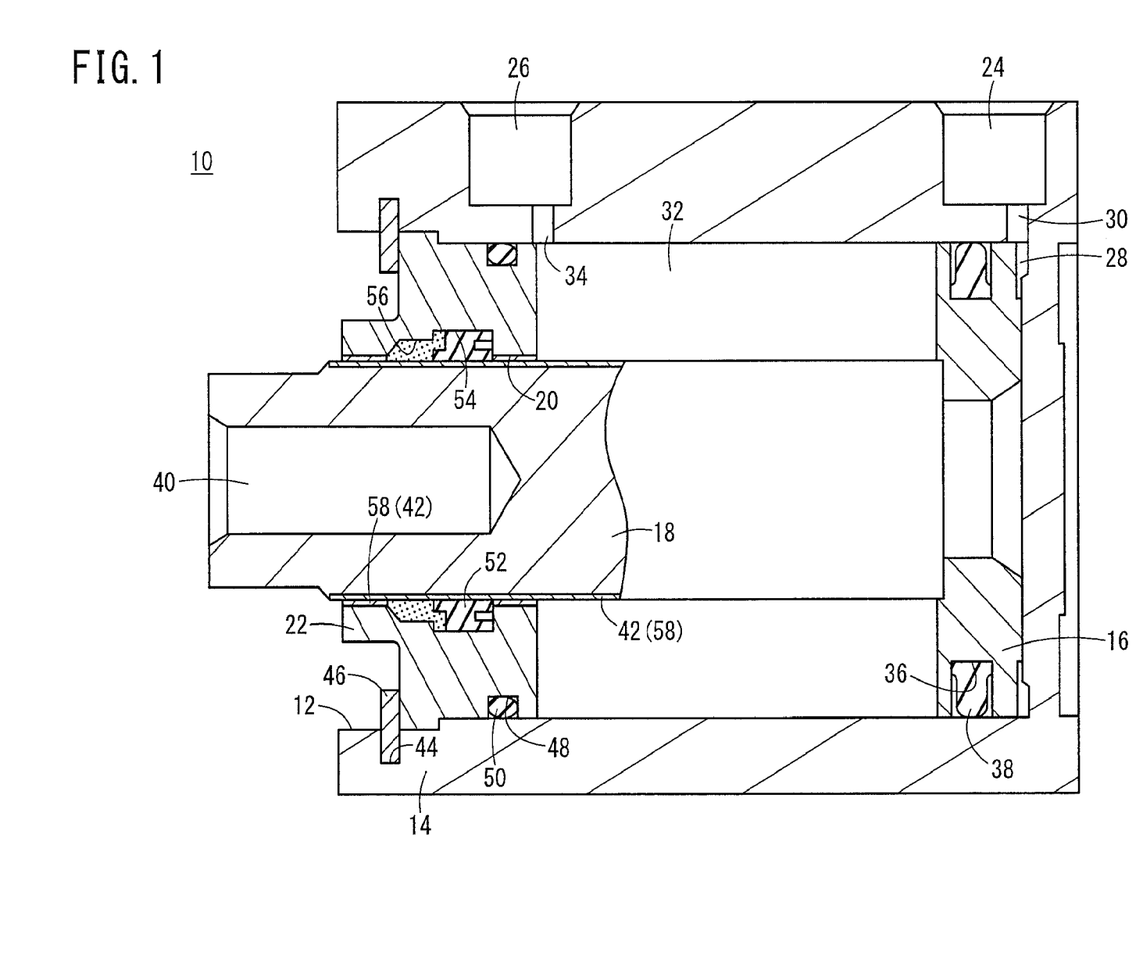
FIG. 1 is a vertical cross-sectional view of a fluid pressure cylinder according to an embodiment of the present invention.

As shown in FIG. 1, a fluid pressure cylinder (sliding device) 10 according to an embodiment of the present invention is equipped with a cylinder main body 14 in which a cylinder hole 12 is formed, a piston 16 disposed in the cylinder hole 12 and which is displaceable along an axial direction, a piston rod 18 connected to the piston 16, and a rod cover 22 disposed in the cylinder main body 14 and in which a rod insertion hole 20 is formed through which the piston rod 18 is inserted.

The cylinder main body 14 can be constituted from an arbitrary material, and for example, is integrally formed in a bottomed cylindrical shape by aluminum or an aluminum alloy. However, the cylinder main body 14 may also be configured such that an opening on one side of a tube member, both ends of which are open, is closed by an end cover.

A first port 24 and a second port 26, which are connected to a fluid supply source via a flow path and a flow path switching device (not shown), open on an outer surface of the cylinder main body 14. The first port 24 communicates through a first communication passage 30 with a first cylinder chamber 28 that is formed between the piston 16 and the bottom surface of the cylinder main body 14. The second port 26 communicates through a second communication passage 34 with a second cylinder chamber 32 that is formed between the piston 16 and the rod cover 22.

Although it can be constituted by an arbitrary material, the piston 16, for example, is constituted in a cylindrical shape from aluminum or an aluminum alloy. A piston packing 38 is installed through an annular groove 36 on an outer circumferential surface of the piston 16. A magnet for detecting the position of the piston 16 in the axial direction with respect to the cylinder main body 14 may be mounted on the outer circumferential surface of the piston 16. In this case, a sensor attachment groove for attachment of a magnetic detection sensor for detecting magnetism from the magnet is formed on an outer surface of the cylinder main body 14.

The piston rod 18 is formed in a cylindrical shape by aluminum or an aluminum alloy, and one end portion of the piston rod 18 is connected to the piston 16. Consequently, the piston rod 18 is linked for movement together with the piston 16. On another end surface of the piston rod 18, which is exposed to the exterior of the cylinder main body 14 by insertion thereof through the rod insertion hole 20, a mounting hole 40 is formed for attaching a workpiece or the like.

A diamond-like carbon film (hereinafter referred to as a DLC film 42) is formed on the outer circumferential surface (outer wall surface) of the piston rod 18. The DLC film 42 is an amorphous hard film composed of an allotrope of hydrocarbon or carbon, which is excellent in lubricity, abrasion resistance, seizure resistance, etc.

The DLC film 42 can be formed by a CVD (Chemical Vapor Deposition) method, a PVD (Physical Vapor Deposition) method, or the like environmentally friendly without discharging liquid waste. Further, in order to improve adhesion of the DLC film 42 with a substrate material (the piston rod 18), an intermediate layer may be formed between the substrate material and the DLC film 42. Such an intermediate layer can be constituted, for example, by a composite layer made up of DLC and the substrate material. In this case, as the composition ratio of metal in the intermediate layer becomes greater in closer proximity to the substrate material, the composition ratio of the DLC decreases, whereas on the other hand, as the composition ratio of metal becomes smaller as the distance from the substrate is greater, the composition ratio of the DLC increases. By using such an intermediate layer, peeling off of the DLC film 42 from the substrate material can suitably be suppressed.

The hardness of the DLC film 42 increases as it moves away from the substrate material toward the side of the outer surface. More specifically, the Vickers hardness of the DLC film 42 in the vicinity of the substrate material is set to be less than or equal to 900 Hv, whereas the Vickers hardness of the DLC film 42 on the outermost surface is set to be greater than or equal to 1300 Hv. In accordance with this feature, peeling away of the DLC film 42 from the substrate material can more suitably be suppressed. Further, the surface roughness of the DLC film 42 is set to be less than or equal to 1.6 Rz. In accordance with this feature, abrasion and wear of a later-described rod packing 52 can suitably be suppressed.

The DLC film 42 is colored in a different color (for example, black) that differs from the color (metallic color) of aluminum or an aluminum alloy. In this case, it is easy to recognize visually whether the DLC film 42 has peeled off, thereby exposing the underlying aluminum or aluminum alloy. Thus, appropriate measures can be taken before the occurrence of equipment stoppage due to the service life of the fluid pressure cylinder 10.

The film thickness of the DLC film 42 preferably is greater than or equal to 0.1 μm and less than or equal to 5.0 μm, more preferably, is greater than or equal to 0.3 μm and less than or equal to 4.0 μm, and even more preferably, is greater than or equal to 1.0 μm and less than or equal to 4.0 μm. This is because, if the film thickness of the DLC film 42 is less than 0.1 μm, there is a concern that the DLC film 42 will peel away rapidly due to wear and abrasion, whereas if the film thickness of the DLC film 42 is greater than 5.0 μm, formation of the film cannot be performed easily, which leads to a rise in cost.

The rod cover 22 is formed in a circular ring-like shape by aluminum or an aluminum alloy, and supports the piston rod 18 in a state of being disposed on the wall surface that constitutes the cylinder hole 12. Further, the rod cover 22 is prevented from slipping out from the cylinder hole 12 by an annular retaining ring 46, which is attached via an annular groove 44 to the wall surface that constitutes the cylinder hole 12.

A gasket 50 is installed through an annular groove 48 on an outer circumferential surface of the rod cover 22. An annular groove 54 in which the rod packing 52, which is made of a resin material such as urethane rubber, is installed, and a grease accommodating groove (grease reservoir) 56 in which grease (a lubricant) is accommodated are formed on the inner circumferential surface (inner wall surface) of the rod cover 22. In the present embodiment, the grease accommodating groove 56 is positioned more on the side of the retaining ring 46 (on an opposite side from the piston 16) than the annular groove 54.

On at least a portion of the inner circumferential surface of the rod cover 22, an alumite film 58 is formed that slides in contact with the DLC film 42. The alumite film 58 preferably is a hard alumite film as described in JIS 8603. In this case, the abrasion resistance of the alumite film 58 can be further enhanced. However, there is no problem if the alumite film 58 is not the above-described hard alumite film.

The dimension along the axial direction of the grease accommodating groove 56 is set so as to be greater than or equal to 1/5 and less than or equal to 4/5 of the sliding surface length dimension (the length dimension along the axial direction of the alumite film 58 that slides in contact with the DLC film 42). Consequently, grease can be supplied efficiently between the DLC film 42 and the alumite film 58 while appropriately suppressing the pressure that acts on the alumite film 58 from the piston rod 18.

The fluid pressure cylinder 10 according to the present embodiment is constructed basically in the manner described above. Next, operations and advantageous effects of the fluid pressure cylinder 10 will be described. As shown in FIG. 1, a state in which the piston 16 is positioned on a bottom surface side of the cylinder main body 14 will be described as an initial position.

In the initial position, when a working fluid (pressure fluid) is supplied to the first port 24 from the fluid supply source in a state in which the second port 26 is opened to atmosphere by the fluid passage switching device, by an action of the working fluid that flows into the first cylinder chamber 28, the piston 16 is displaced to the side of the rod cover 22, together with the fluid that exists in the second cylinder chamber 32 being discharged to atmosphere through the second port 26. In addition, by the piston 16 coming into contact with the rod cover 22, displacement of the piston 16 toward the side of the rod cover 22 is stopped.

When a working fluid is supplied to the second port 26 from the fluid supply source in a state in which the first port 24 is opened to atmosphere by the fluid passage switching device, by an action of the working fluid that flows into the second cylinder chamber 32, the piston 16 is displaced to the bottom surface side of the cylinder main body 14, together with the fluid that exists in the first cylinder chamber 28 being discharged to atmosphere through the first port 24. In addition, by the piston 16 coming into contact with the bottom surface of the cylinder main body 14, displacement of the piston 16 toward the bottom surface side of the cylinder main body 14 is stopped.

According to the present embodiment, when the piston 16 (piston rod 18) is displaced in this manner along the axial direction, the DLC film 42 and the alumite film 58 undergo sliding movement in a state in which the grease that is accommodated in the grease accommodating groove 56 is supplied between the DLC film 42 that is formed on the outer circumferential surface of the piston rod 18 and the alumite film 58 that is formed on the inner circumferential surface of the rod cover 22. The DLC film 42 possesses chemical stability and self-lubricity in order to prevent adhesion thereof with aluminum and alumite. Therefore, the piston rod 18 is displaced in a state in which sliding wear and adhesive wear are suppressed. Consequently, it is possible to realize a long service life of the fluid pressure cylinder 10.

Further, in addition to constituting the piston rod 18 and the rod cover 22 from aluminum or an aluminum alloy, since there is no need to provide a copper bush in the rod insertion hole 20, the number of component parts can be reduced, a reduction in weight can be achieved, and the fluid pressure cylinder 10 can be used even in a copper-based material non-usage environment.

Furthermore, since the DLC film 42 is formed on the outer circumferential surface of the piston rod 18, which is easier to coat than the inner circumferential surface constituting the rod insertion hole 20, manufacturing costs for the fluid pressure cylinder 10 can be reduced. Further still, since the grease accommodating groove 56 in which grease is accommodated is formed on the inner circumferential surface of the rod cover 22, grease can be supplied between the DLC film 42 and the alumite film 58, and hence, sliding wear of the rod cover 22 can be suppressed. Consequently, it is possible to prolong the service life of the fluid pressure cylinder 10.

The present embodiment is not limited to the configuration described above. For example, the grease accommodating groove 56 may be dispensed with (refer to FIG. 3), or the grease accommodating groove 56 may be formed more on the side of the piston 16 than the rod packing 52 (refer to FIG. 4). Further, in the present embodiment, the alumite film 58 may be formed on the outer circumferential surface of the piston rod 18, and the DLC film 42 that slides in contact with the alumite film 58 may be formed on the inner circumferential surface of the rod cover 22. In this case as well, advantages and effects similar to those mentioned above can be obtained.

EXAMPLES

The present invention will be described in greater detail through presentation of the following examples of the present invention. Materials, configurations, film thicknesses, etc., as shown in the following examples can be appropriately modified without deviating from the essential gist of the present invention. Consequently, the technical scope of the present invention should not be interpreted restrictively by the following specific examples.

First through third examples, and first and second comparative examples are shown in Table 1 appearing below.

TABLE 1

|  |  | Example 1 | Example 2 | Example 3 | Comparative Example 1 | Comparative Example 2 |
| --- | --- | --- | --- | --- | --- | --- |
| Piston Rod | Material | A2017 | A2017 | A2017 | S45C | S45C |
|  | Film | DLC | DLC | DLC | Hard Chromium | Hard Chromium |
|  | Film Thickness (μm) | 1-2 | 1-2 | 1-2 | 8 | 8 |
| Rod Cover | Material | A6061-T6 | A6061-T6 | A6061-T6 | A6061-T6 | A6061-T6 |
|  | Film | Hard Alumite | Hard Alumite | Hard Alumite | Hard Alumite | Hard Alumite |
|  | Film Thickness (μm) | 15 | 15 | 15 | 15 | 15 |

TABLE 1-continued

| | Example 1 | Example 2 | Example 3 | Comparative Example 1 | Comparative Example 2 |
|---|---|---|---|---|---|
| Rod Cover Length Dimension | La | La | Lb | La | Lb |
| Grease Accommodating Groove Present | YES | NO | YES | NO | NO |
| Bush Present | NO | NO | NO | NO | YES |

Example 1

Figure 2:
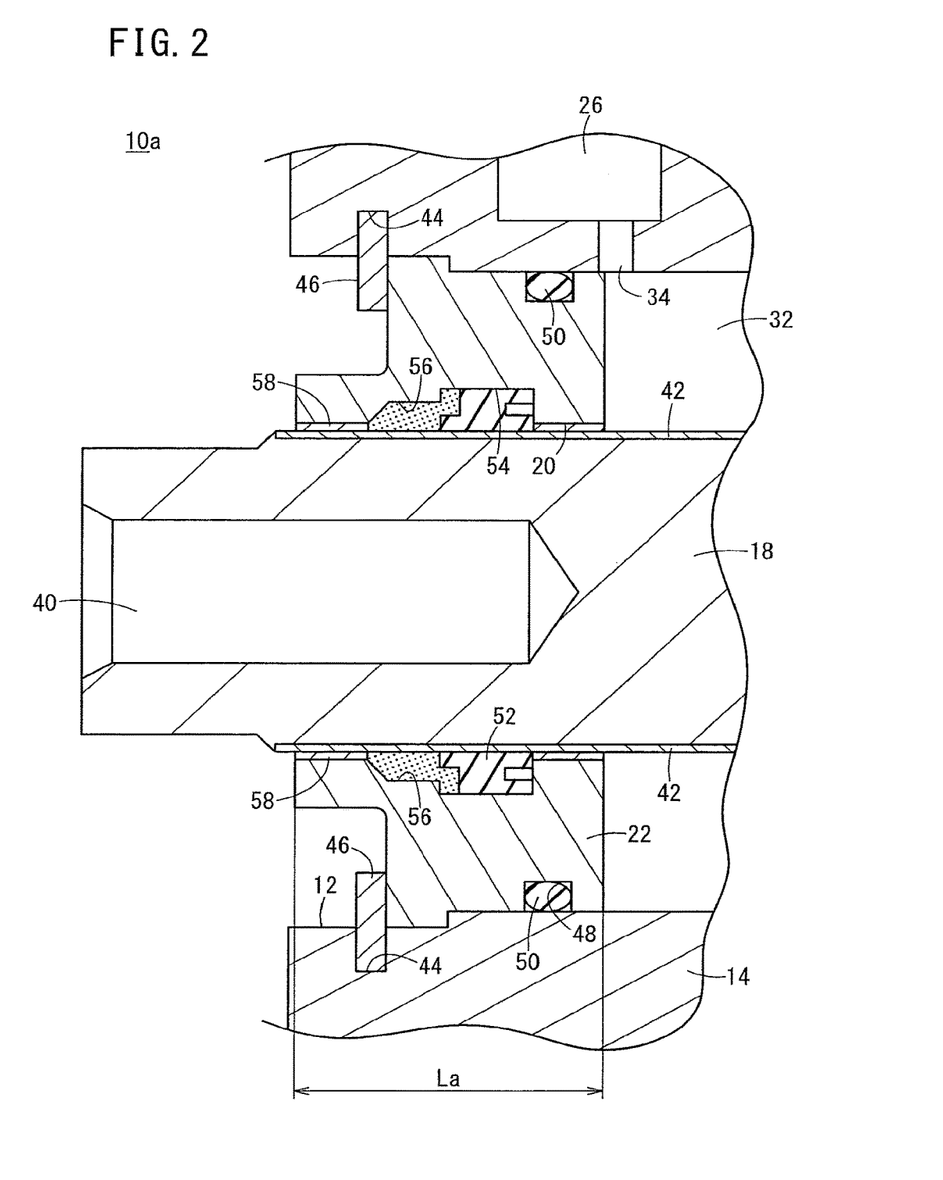
FIG. 2 is a partially enlarged vertical cross-sectional view showing a configuration of the fluid pressure cylinder according to a first example.

As shown in FIG. 2, a fluid pressure cylinder 10a according to Example 1 was manufactured. The fluid pressure cylinder 10a was constituted in the same manner as the aforementioned fluid pressure cylinder 10. More specifically, the piston rod 18 was made of an aluminum alloy (A2017: JIS standard), and a DLC film 42 having a film thickness of 1 µm to 2 µm was formed on an outer circumferential surface of the piston rod 18. Further, the rod cover 22 was made of an aluminum alloy (A6061-T6: JIS standard). An alumite film (hard alumite film) 58 having a film thickness of 15 µm was formed on an inner circumferential surface of the rod cover 22. The length dimension along the axial direction of the rod cover 22 according to Example 1 is indicated by La. Moreover, the diameter of the piston rod 18 was set to 16 mm, and the stroke of the piston 16 was set to 50 mm.

Example 2

Figure 3:
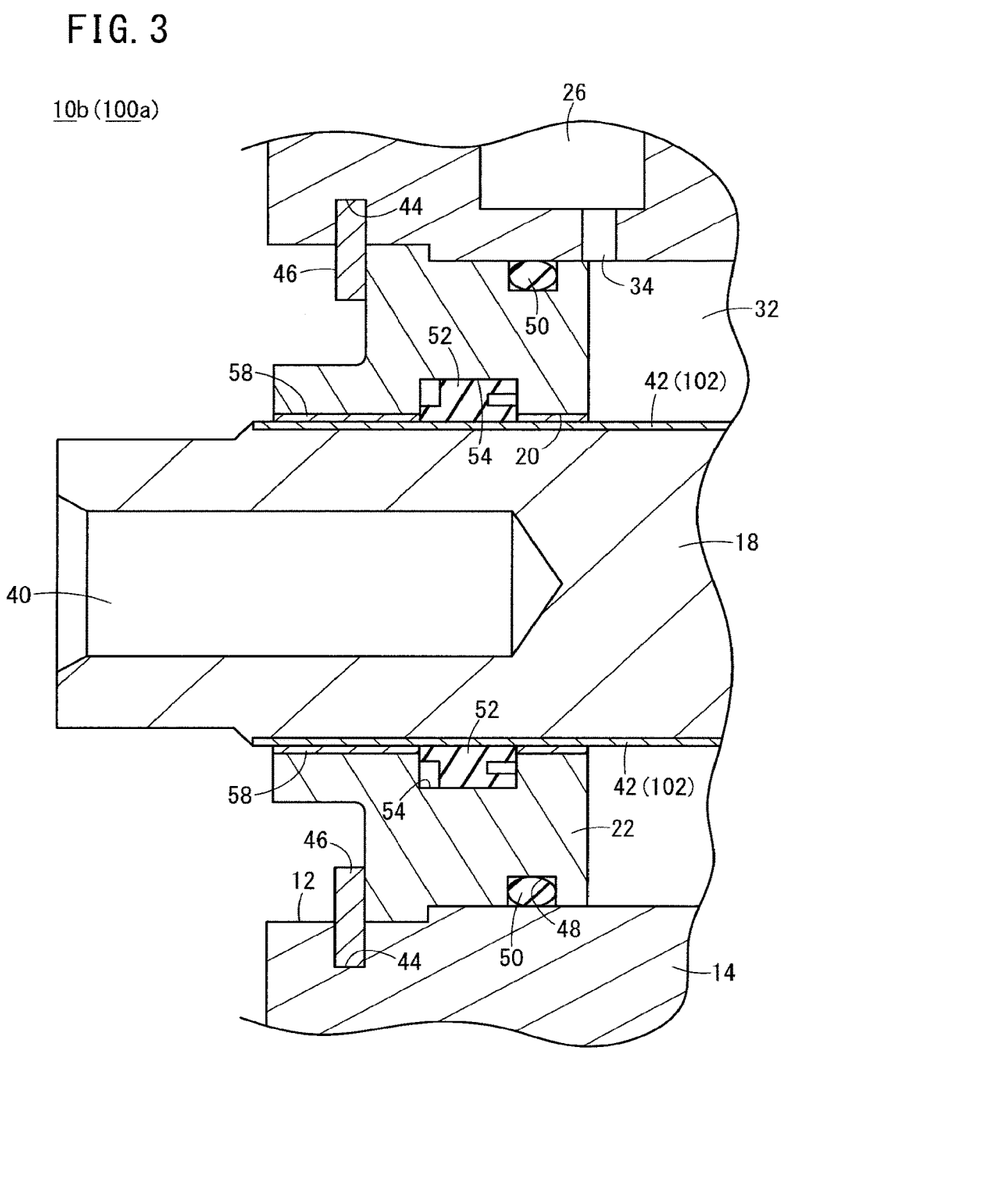
FIG. 3 is a partially enlarged vertical cross-sectional view showing a configuration of the fluid pressure cylinder according to a second example (a fluid pressure cylinder according to a first comparative example)

As shown in FIG. 3, a fluid pressure cylinder 10b according to Example 2 was manufactured. More specifically, the fluid pressure cylinder 10b according to Example 2 was produced in the same manner as in Example 1, except that the grease accommodating groove 56 was omitted.

Example 3

Figure 4:
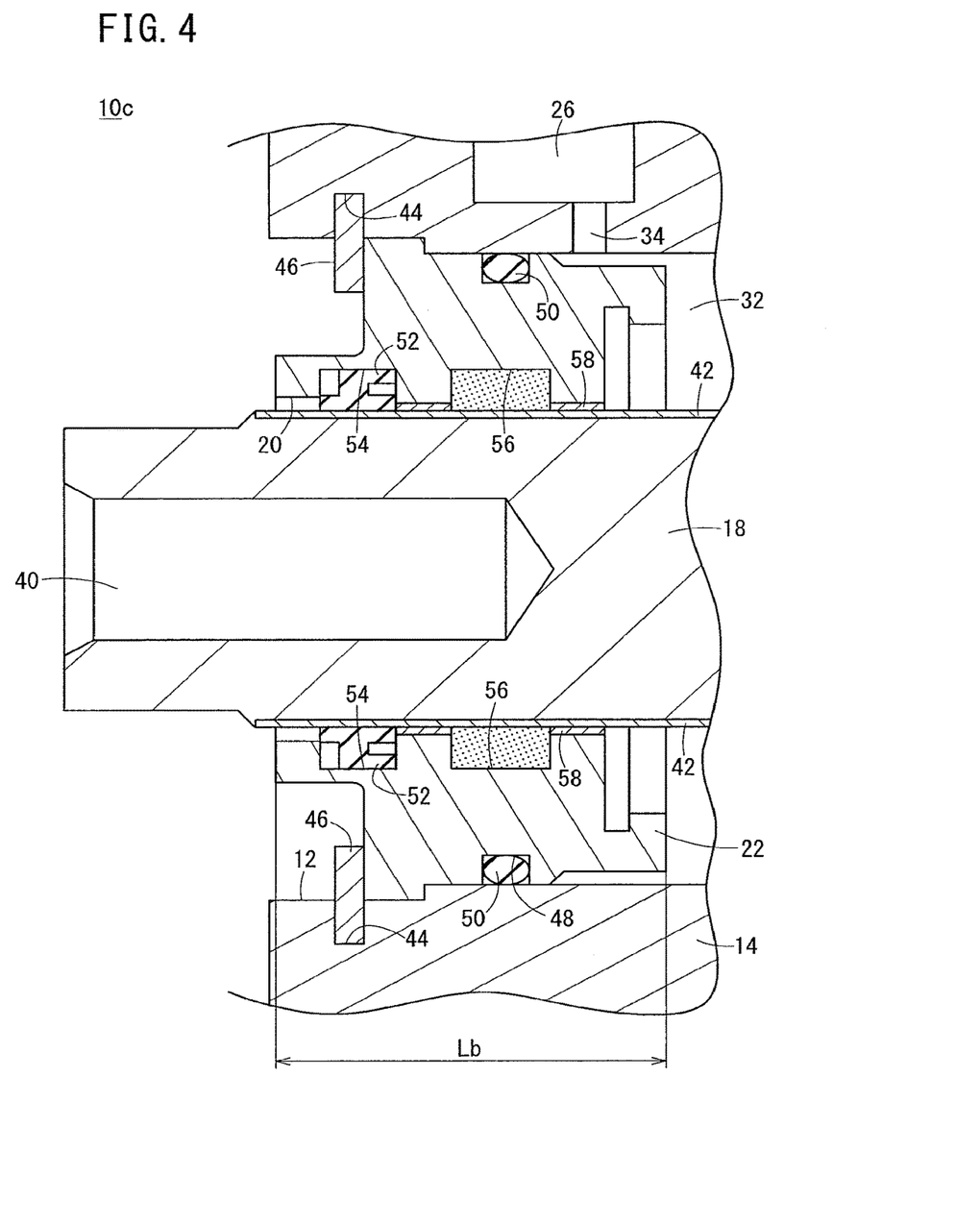
FIG. 4 is a partially enlarged vertical cross-sectional view showing a configuration of the fluid pressure cylinder according to a third example.

As shown in FIG. 4, a fluid pressure cylinder 10c according to Example 3 was manufactured. In the fluid pressure cylinder 10c according to Example 3, the constituent materials of the piston rod 18 and the rod cover 22, the film thicknesses of the DLC film 42 and the alumite film 58, the diameter of the piston rod 18, and the stroke of the piston 16 are the same as those according to Example 1. Further, the length dimension along the axial direction of the rod cover 22 according to Example 3 is indicated by Lb, which was longer than the length dimension La. Further, the grease accommodating groove 56 was formed more on the side of the piston 16 than the rod packing 52.

Comparative Example 1

The piston rod 18 was made of carbon steel (S45C: JIS standard), and apart from a hard chromium film 102 having a film thickness of 8 µm being formed on the outer circumferential surface of the piston rod 18, the fluid pressure cylinder 100a according to Comparative Example 1 was manufactured in the same manner as Example 2 (refer to FIG. 3).

Comparative Example 2

Figure 5:
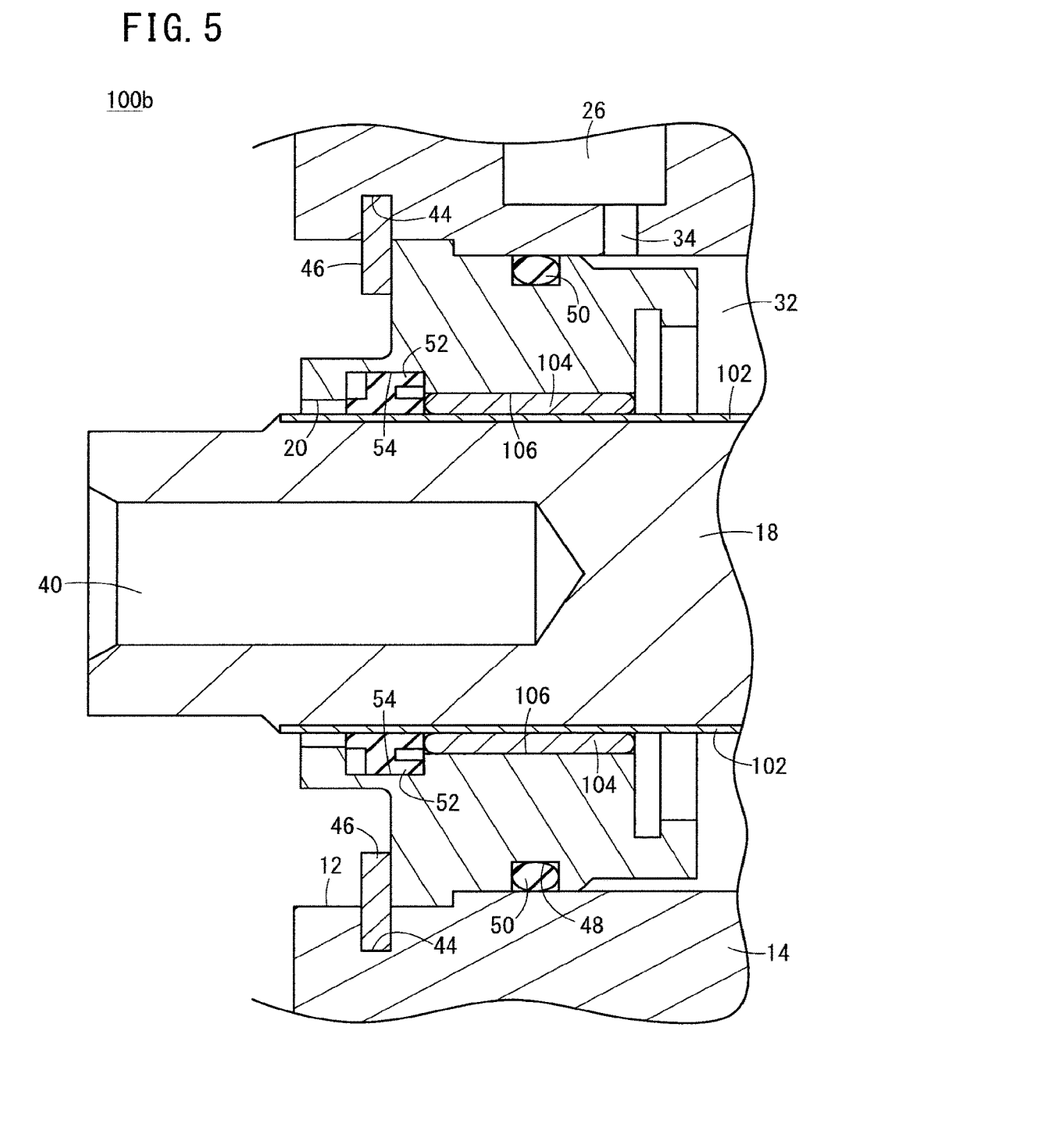
FIG. 5 is a partially enlarged vertical cross-sectional view showing the configuration of a fluid pressure cylinder according to a second comparative example.

As shown in FIG. 5, a fluid pressure cylinder 100b according to Comparative Example 2 was manufactured. With the fluid pressure cylinder 100b according to Comparative Example 2, a bush installation groove 106 for installation therein of a lead bronze bush 104 was formed, instead of the grease accommodating groove 56 according to Example 3. Further, the piston rod 18 and the hard chromium film 102 were formed in the same manner as in Comparative Example 1, and apart therefrom, the fluid pressure cylinder 100b was manufactured in the same manner as in Example 3.

[Evaluation]
(Measurement of Weight)

The weights of the fluid pressure cylinders 10a, 10c, 100a, 100b according to Example 1, Example 3, Comparative Example 1, and Comparative Example 2 were measured.

(Measurement of Service Life)

In the fluid pressure cylinders 10a, 10b, 100a of Example 1, Example 2, and Comparative Example 1, the minimum operating pressures with respect to the number of times that the piston was driven were measured. Further, the maximum wear depths of the alumite films 58 of Example 1, Example 2, and Comparative Example 1, after the piston 16 was driven ten million times, were measured using a roundness measuring machine (ACCRETECH RONDCOM 60A) manufactured by Tokyo Seimitsu Co., Ltd. The measurement conditions were as follows:

Roundness Evaluation: maximum inscribed circle center method (MIC)
Filter Type: 2 RC
Measurement Method: semiautomatic measurement
Measurement Speed: 5 mm/s
Posture: vertical

RESULTS

Figure 6:
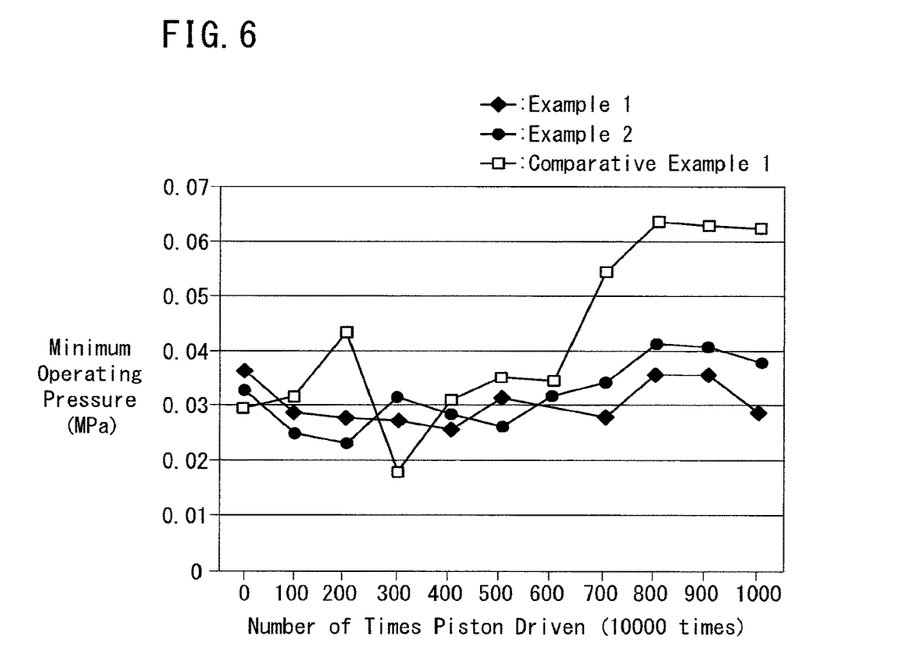
FIG. 6 is a graph showing a minimum operating pressure plotted with respect to the number of times the piston is driven.
Figure 7:
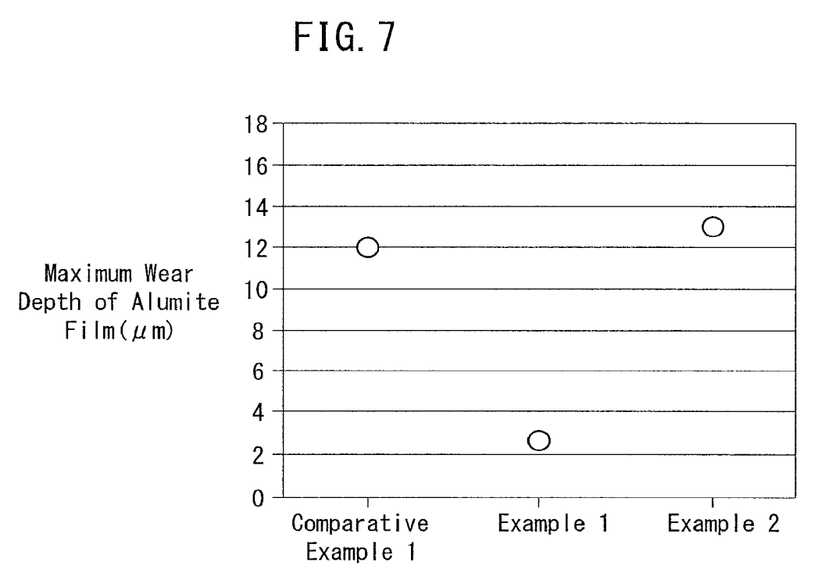
FIG. 7 is a graph showing a maximum wear depth of an alumite film after the piston was driven ten million times.

The weight measurement results are indicated in Table 2 below, and the service life measurement results are as shown in FIGS. 6 and 7.

TABLE 2

| | Example 1 | Example 2 | Example 3 | Comparative Example 1 | Comparative Example 2 |
|---|---|---|---|---|---|
| Weight of Fluid Pressure Cylinder | 230 g | — | 260 g | 320 g | 350 g |

As indicated in Table 2, the weight of the fluid pressure cylinder 100a according to Comparative Example 1 was 320 g, whereas the weight of the fluid pressure cylinder 10a according to Example 1 was 230 g. More specifically, by configuring the piston rod 18 from an aluminum alloy, the weight of the fluid pressure cylinder 10a can be reduced by about 28% compared to the weight of the fluid pressure cylinder 100a.

Further, the weight of the fluid pressure cylinder 100*b* according to Comparative Example 2 was 350 g, whereas the weight of the fluid pressure cylinder 10*c* according to Example 3 was 260 g. More specifically, by configuring the piston rod 18 from an aluminum alloy together with eliminating the lead bronze bush 104, the weight of the fluid pressure cylinder 10*c* can be reduced by about 25% compared to the weight of the fluid pressure cylinder 100*b*.

Moreover, in the fluid pressure cylinder 10*c* according to Example 3, since the grease accommodating groove 56 is formed at a position where the bush 104 had been located in the fluid pressure cylinder 100*b* according to Comparative Example 2, the fluid pressure cylinder 10*c* is not increased in scale, even if the grease accommodating groove 56 is formed therein.

Furthermore, as can be understood from FIG. 6, with the fluid pressure cylinder 100*a* according to Comparative Example 1, the minimum operating pressure rises rapidly when the number of times the piston was driven exceeds six million, whereas with the fluid pressure cylinders 10*a*, 10*b* according to Examples 1 and 2, the minimum operating pressure is suppressed and remains comparatively low, even if the number of times the piston was driven exceeds ten million. Further, at a time after the piston 16 has been driven ten million times, the minimum operating pressure of the fluid pressure cylinder 10*a* became lower than the minimum operating pressure of the fluid pressure cylinder 10*b*. Moreover, in the fluid pressure cylinders 10*a*, 10*b*, 100*a* of Example 1, Example 2, and Comparative Example 1, the airflow rate was less than or equal to 1 cc/min.

In the foregoing manner, by forming the DLC film 42 on the outer circumferential surface of the piston rod 18, together with forming the alumite film 58 on the inner circumferential surface of the rod cover 22, the minimum operating pressure could be suppressed and remain comparatively low, and the service life could be prolonged, even though the number of times the piston was driven ten million times was reached. Further, in the case that the grease accommodating groove 56 was provided on the inner circumferential surface of the rod cover 22, compared to the case of not providing the grease accommodating groove 56, the minimum operating pressure at a time after the piston 16 was driven ten million times could be lowered, and the service life could further be prolonged.

Further still, as can be understood from FIG. 7, the maximum wear depth of the fluid pressure cylinder 10*a* according to the first embodiment could be suppressed to about ¼ the maximum wear depth of the alumite film 58 of the fluid pressure cylinder 100*a* according to Comparative Example 1, and the service life of the fluid pressure cylinder 10*a* could be prolonged even further.

The fluid pressure cylinder according to the present invention is not limited to the embodiment described above, and it is a matter of course that various modified or additional configurations could be adopted therein without deviating from the essential gist of the present invention.

The invention claimed is:

1. A fluid pressure cylinder comprising:
a cylinder main body in which a cylinder hole is formed;
a piston disposed in the cylinder hole and which is displaced along an axial direction under an action of a working fluid;
a piston rod connected to the piston; and
a rod cover in which a rod insertion hole is formed through which the piston rod is inserted;
wherein the piston rod and the rod cover are constituted from aluminum or an aluminum alloy;
an alumite film or a diamond-like carbon film is formed on at least a portion of an inner wall surface of the rod cover constituting the rod insertion hole;
in the case that the alumite film is formed on the inner wall surface of the rod cover, a diamond-like carbon film that slides in contact with the alumite film is formed on an outer wall surface of the piston rod, whereas in the case that the diamond-like carbon film is formed on the inner wall surface of the rod cover, an alumite film that slides in contact with the diamond-like carbon film is formed on the outer wall surface of the piston rod;
an annular groove provided in the inner wall surface of the rod cover;
a rod packing provided in a portion of the annular groove; and
a lubricant provided in another portion of the annular groove, said another portion of the groove not having the rod packing, whereby said another portion of the groove comprises a lubricant accommodating groove wherein a length of the lubricant accommodating groove in the axial direction is between ⅕ and ⅘ of a length of the alumite film that slides in contact with the diamond-like carbon film,
wherein said another portion of the annular groove is located at a side of the rod packing which is opposite the piston along the axial direction.

2. The fluid pressure cylinder according to claim 1, wherein:
the alumite film is formed on the inner wall surface of the rod cover; and
the diamond-like carbon film that slides in contact with the alumite film is formed on an outer wall surface of the piston rod.

* * * * *